United States Patent
Liu et al.

(10) Patent No.: US 11,536,816 B2
(45) Date of Patent: Dec. 27, 2022

(54) VEHICLE INFORMATION DIRECTIONAL TRANSMISSION METHODS AND DEVICES

(71) Applicant: BOE TECHNOLOGY GROUP CO., LTD., Beijing (CN)

(72) Inventors: Cheng Liu, Beijing (CN); Changlin Leng, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 790 days.

(21) Appl. No.: 16/475,110

(22) PCT Filed: Jan. 7, 2019

(86) PCT No.: PCT/CN2019/070607
§ 371 (c)(1),
(2) Date: Jun. 30, 2019

(87) PCT Pub. No.: WO2019/153992
PCT Pub. Date: Aug. 15, 2019

(65) Prior Publication Data
US 2021/0405170 A1   Dec. 30, 2021

(30) Foreign Application Priority Data

Feb. 8, 2018   (CN) .......................... 201810128994.3

(51) Int. Cl.
*G01S 7/52* (2006.01)
*B60Q 5/00* (2006.01)
(Continued)

(52) U.S. Cl.
CPC ............ *G01S 7/52001* (2013.01); *B60Q 5/00* (2013.01); *G01S 7/527* (2013.01); *G01S 15/104* (2013.01);
(Continued)

(58) Field of Classification Search
CPC .............................. H04R 2499/13; H04R 3/12
(Continued)

(56) References Cited

U.S. PATENT DOCUMENTS 8,725,313 B2   5/2014   Purushothaman et al.
10,225,648 B1 *  3/2019   Voishvillo .............. H04R 1/403
(Continued)

FOREIGN PATENT DOCUMENTS

CN   101682813 A   3/2010
CN   102394724 A   3/2012
(Continued)

OTHER PUBLICATIONS

International Search Report in Application No. PCT/CN2019/070607, dated Mar. 25, 2019.
(Continued)

*Primary Examiner* — Alexander Krzystan
(74) *Attorney, Agent, or Firm* — Syncoda LLC; Feng Ma

(57) ABSTRACT

A system configured for vehicle communication includes a first smart apparatus associated with a first vehicle having a first horn and configured to acquire a first target information and a transmission direction information; a first horn control portion embedded in the first vehicle and configured to control the first horn in the first vehicle to send a first sound wave signal modulated by the first target information to a second vehicle based on the transmission direction information; and a second smart apparatus associated with the second vehicle and configured to receive the first sound wave signal and demodulate the first sound wave signal to obtain the first target information.

14 Claims, 13 Drawing Sheets

(51) Int. Cl.
  *G01S 7/527* (2006.01)
  *G01S 15/10* (2006.01)
  *G10L 15/22* (2006.01)
  *H04R 1/40* (2006.01)
(52) U.S. Cl.
  CPC .............. *G10L 15/22* (2013.01); *H04R 1/403* (2013.01); *G10L 2015/223* (2013.01); *H04R 2499/13* (2013.01)
(58) Field of Classification Search
  USPC ..................................... 381/302, 86; 367/99
  See application file for complete search history.

(56) References Cited

U.S. PATENT DOCUMENTS

| | | | |
|---|---|---|---|
| 10,784,670 B2* | 9/2020 | Bennett | H01Q 1/12 |
| 2002/0101360 A1* | 8/2002 | Schrage | G08G 1/0962 |
| | | | 340/901 |
| 2007/0252748 A1* | 11/2007 | Rees | H01Q 13/02 |
| | | | 342/36 |
| 2011/0134971 A1 | 6/2011 | Choi et al. | |
| 2013/0261887 A1* | 10/2013 | Raz | B60Q 5/00 |
| | | | 381/77 |
| 2014/0142958 A1* | 5/2014 | Sharma | G10L 19/02 |
| | | | 704/500 |
| 2016/0050309 A1* | 2/2016 | Gooberman | H04M 1/72463 |
| | | | 455/418 |
| 2019/0276055 A1* | 9/2019 | Cooper | B60L 15/00 |
| 2021/0405170 A1* | 12/2021 | Liu | H04R 1/403 |

FOREIGN PATENT DOCUMENTS

| | | |
|---|---|---|
| CN | 103295424 A | 9/2013 |
| CN | 104527516 A | 4/2015 |
| CN | 105337671 A | 2/2016 |
| CN | 105469481 A | 4/2016 |
| CN | 105519016 A | 4/2016 |
| CN | 105704648 A | 6/2016 |
| CN | 106375456 A | 2/2017 |
| CN | 106375908 A | 2/2017 |
| CN | 106558210 A | 4/2017 |
| CN | 206181343 U | 5/2017 |
| CN | 106899356 A | 6/2017 |
| CN | 107257259 A | 10/2017 |
| CN | 107371096 A | 11/2017 |

OTHER PUBLICATIONS

CN Reexamination Office Action in Application No. 201810128994.3, dated Nov. 25, 2020.

* cited by examiner

VEHICLE INFORMATION DIRECTIONAL TRANSMISSION METHODS AND DEVICES

CROSS-REFERENCE TO RELATED APPLICATIONS

The present application claims priority to Chinese Patent Application No. 201810128994.3 filed on Feb. 8, 2018, the disclosure of which is hereby incorporated by reference in its entirety.

TECHNICAL FIELD

The present disclosure relates to the fields of communications, and more specifically to methods and devices for communications between vehicles.

BACKGROUND

More and more vehicles are joining large networks of transportations. Such vehicles may include, for example, passenger cars, vans, recreational vehicles, trucks, self-driving vehicles, aircraft, unmanned aerial vehicles (UAVs), etc.

At present, communications between vehicles are mainly carried out through conventional communication networks, such as those based on radio signals, and generally need to use a base station (or an ad hoc network).

SUMMARY

In a first aspect, a system configured for vehicle communication is provided, including: a first smart apparatus associated with a first vehicle having a first horn and configured to acquire a first target information and a transmission direction information; a first horn control portion embedded in the first vehicle and configured to control the first horn in the first vehicle to send a first sound wave signal modulated by the first target information to a second vehicle based on the transmission direction information; and a second smart apparatus associated with the second vehicle and configured to receive the first sound wave signal and demodulate the first sound wave signal to obtain the first target information.

In some embodiments, the first smart apparatus includes: a first location portion configured to acquire first position information of the first vehicle as the first target information; and a first direction acquisition portion configured to acquire the transmission direction information.

In some embodiments, the first smart apparatus includes: a first wireless communication portion having an identifier as the first target information; and a first direction acquisition portion configured to acquire the transmission direction information.

In some embodiments, the first smart apparatus includes: a first location portion configured to acquire first position information of the first vehicle; a first wireless communication portion having an identifier; a first direction acquisition portion configured to acquire the transmission direction information; wherein the first target information comprises the first position information of the first vehicle and the identifier.

In some embodiments, the identifier comprises at least one of a mac address or an IP address.

In some embodiments, the first horn control portion includes: an acquisition sub-portion configured to acquire the first target information and the transmission direction information from the first smart apparatus; a modulation sub-portion configured to modulate the first target information onto the first sound wave signal; and a sending sub-portion configured to send the first sound wave signal to the second vehicle based on the transmission direction information.

In some embodiments, the second smart apparatus includes: a second sound pickup portion configured to receive the first sound wave signal; and a second demodulation portion configured to demodulate the first sound wave signal to obtain the first target information.

In some embodiments, the second smart apparatus includes: a second sound pickup portion configured to receive the first sound wave signal; a second demodulation portion configure to demodulate the first sound wave signal to obtain the first target information; and a second wireless communication portion configured to communication with the first wireless communication portion.

In some embodiments, the first smart apparatus further includes: a receiving portion configured to receive a second signal returned by the second vehicle according to the first target information; and an analyzing portion configured to analyze the second signal to obtain a second target information.

In some embodiments, the second target information includes: first position information of the second vehicle, first speed information of the second vehicle, and first time information when the second vehicle transmits the second signal.

In some embodiments, the first wireless communication portion includes: a location and time acquisition sub-portion configured to acquire second position information and first time information of the first vehicle; a second position calculation sub-portion configured to calculate second position information of the second vehicle according to the first time information of the first vehicle and the second target information; a first relative position determining sub-portion configured to determine a relative position information of the second vehicle and the first vehicle according to the second position information of the first vehicle and the second position information of the second vehicle; and a first communication establishing sub-portion configured to establish a communication between the first vehicle and the second vehicle according to the relative position information.

In some embodiments, the second target information further includes a target identifier.

In some embodiments, the first wireless communication portion includes: a second communication establishing sub-portion configured to establish a communication between the first vehicle and the second vehicle according to the target identifier.

In some embodiments, the system further includes: an on-screen display portion configured to display the second target information on a display screen; and/or a playing portion configured to play the second target information by voice.

In some embodiments, the acquisition sub-portion includes at least one of: a first signal direction determining sub-portion, configured to monitor a key control information input by a user, and determine a transmission direction according to the key control information; a second signal direction determining sub-portion configured to monitor a user-entered knob control information, and determine the transmission direction according to the knob control information; a third signal direction determining sub-portion configured to monitor a user's eye movement direction and a sight direction, and determine the transmission direction according to the eye movement direction and the sight direction; or a fourth signal direction determining sub-portion configured to monitor a voice command input by the user, and determine the transmission direction according to the voice command.

In some embodiments, the sending sub-portion includes a plurality of speakers forming an array; and the array comprises a phase control array configured to generate the sound wave signal with specified direction according to the transmission direction information.

In another aspect, a method for vehicle communication is provided, including: obtaining first target information and transmission direction information from a first vehicle; modulating the first target information onto a first sound wave signal; and sending the first sound wave signal to a second vehicle according to the transmission direction information.

In some embodiments, the method further includes, after the sending the first signal to the second vehicle according to the transmission direction information: receiving a second signal returned by the second vehicle according to the first target information; analyzing the second signal to obtain second target information; and establishing a communication between the first vehicle and the second vehicle according to the second target information.

In some embodiments, the second target information includes a first position information of the second vehicle, a first velocity information of the second vehicle, and a first time information of the second vehicle when the second vehicle transmits the second signal.

In some embodiments, the establishing the communication between the first vehicle and the second vehicle according to the second target information includes: acquiring a second position information and a second time information of the first vehicle; calculating a second position information of the second vehicle according to the second time information and the second target information; determining relative position information of the second vehicle and the first vehicle according to the second position information of the first vehicle and the second position information of the second vehicle; and establishing the communication between the first vehicle and the second vehicle according to the relative position information.

In some embodiments, after the analyzing the second signal to obtain the second target information, the method further includes: displaying the second target information on a display screen; and/or playing the second target information by voice.

In some embodiments, the obtaining the first target information and the transmission direction information from the first vehicle includes at least one of: monitoring a key control input by a user, and determining the transmission direction according to the key control; monitoring a knob control input by the user, and determining a transmission direction according to the knob control; monitoring the user's eye movement direction and a sight direction, and determining the transmission direction according to the eye movement direction and the sight direction; or monitoring a voice command input by the user, and determining the transmission direction according to the voice command.

In another aspect, a vehicle is provided, including: a first smart apparatus configured to acquire a first target information and a transmission direction information; a first horn, and a first horn control portion configured to control the first horn to send a first sound wave signal modulated by the first target information to a second vehicle based on the transmission direction information.

In some embodiments, the vehicle comprises at least one of a boat, an aircraft, or an unmanned aerial vehicle (UAV).

In another aspect, a smart apparatus configured for directional communication between a first vehicle and a second vehicle is provided, the smart apparatus including: a first location portion configured to acquire position information of the first vehicle as a first target information; a first direction acquisition portion configured to acquire a transmission direction information containing a relative direction between the first vehicle and the second vehicle; and a first wireless communication portion having an identifier of at least one of a mac address or an IP address.

In some embodiments, the smart apparatus further includes a direction obtaining portion configured to obtain transmission direction through one or more of: key inputs, knob or dial control, voice command, or eye movement tracking.

In an example implementation, the system, method and device for directional transmitting a vehicle information can be applied to the first vehicle. The first target information of the first vehicle can be modulated onto a sound wave signal by obtaining the first target information and a transmission direction information, and the first target information is transmitted according to the transmission direction information. The first sound wave signal is sent to the second vehicle.

Therefore, various embodiments of the present disclosure can realize directional communications between the first vehicle and the second vehicle according to the transmission direction information.

BRIEF DESCRIPTION OF DRAWINGS

To more clearly illustrate some of the embodiments, the following is a brief description of the drawings.

The drawings in the following descriptions are only illustrative of some embodiments. For those of ordinary skill in the art, other drawings of other embodiments can become apparent based on these drawings.

DETAILED DESCRIPTION

In the following, with reference to the drawings of the embodiments disclosed herein, technical solutions of various embodiments of the present disclosure will be described in a clear and fully understandable way.

It is noted that the described embodiments are merely some but not all of the embodiments of the present disclosure. Based on the described embodiments of the invention, those or ordinary skill in the art can obtain other embodiment(s), which come(s) within the scope sought for protection by the present disclosure.

Various embodiments of the present disclosure provide directional communications systems, methods and devices, such that communications between specific vehicles or to a target vehicle (such as a specific vehicle in sight in a certain direction) can be realized, unlike conventional communication networks that are non-directional.

In order to achieve communications with a specified vehicle in a specified direction and range, the following approaches may be employed.

In one approach, a beacon containing the license plate information of a source vehicle can be broadcasted to the surroundings, for example through a Bluetooth device on the source vehicle. Drivers and/or passengers in other vehicles can select the corresponding license plate information to communicate with the source vehicle.

This approach requires the drivers and/or passengers to see the license plate of the source vehicle and identify it, which may be difficult to achieve. In addition, movement and shielding by vehicles in the actual road condition can further make it difficult for such targeted communications.

In another approach, Dedicated Short Range Communication (DSRC) may be adopted, where a horn or whistle signal is wirelessly transmitted to other vehicles, and the other vehicles receiving the signal can allow the speaker in the vehicle to play a sound signal corresponding to the horn or whistle signal. However, DSRC is a wireless communication that still does not have directionality, and it is difficult to implement directional communication through DSRC.

Various embodiments of the present disclosure provide systems, methods and devices for sending a directional vehicle information to solve the problem that the directional communication of vehicles in the existing scheme is difficult to achieve.

Figure 1:
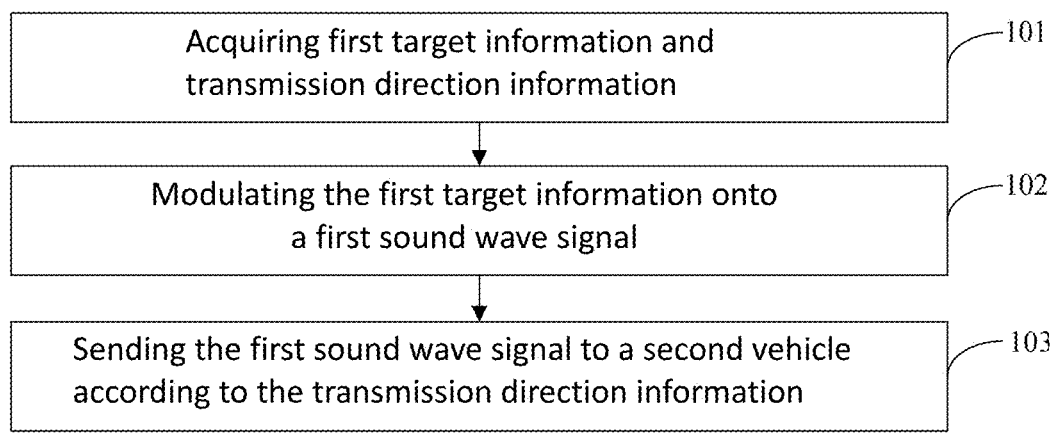
FIG. 1 is a flowchart of steps of a vehicle information directional transmission method according to some embodiments of the present disclosure.

FIG. 1 is a flowchart of steps of a method for directional transmitting of a vehicle information according to some embodiments of the present disclosure. The method for directional transmitting of information may be applied to a first vehicle, and can include the following steps.

Step 101: Obtaining first target information and transmission direction information.

In some embodiments of the present disclosure, the first target information refers to information which the user of the first vehicle needs to send to other vehicle users. The transmission direction information refers to the transmission direction of the first target information according to the position of other vehicles relative to the first vehicle.

The first target information can comprise one or more of a voice information, a text information, a picture information, or a video information, which are not limited in the embodiments of the present disclosure.

In some embodiments of the present disclosure, the transmission direction information may be obtained through one or more of the following methods.

(1) Monitoring a key control information input by the user, and determine a direction of sound wave input by the user according to the key control information.

A direction acquisition member can be installed on the first vehicle, and keys indicating different directions may be set on the direction acquisition member, such as "left," "right," "front," "back," etc., which can also be indicated by arrows.

The direction of the user's input can be determined by monitoring the user's selected keys in real time. For example, when the user selects the "left" or left-arrow key, it can be determined that the transmission direction of the signal desired by the user is the left side of the first vehicle.

(2) Monitoring a knob control information input by user, and determining the transmission direction of the signal as desired by the user according to the knob control information.

A rotary disk, dial or knob can be set on the direction obtaining member of the first vehicle, and different direction information can be provided around the circular periphery of the rotary dial, such as 30° to the right in the front, etc.

A knob can be provided at the center position of the rotary dial. The direction in which the knob is pointing can be the direction of signal transmission. When the user rotates the knob, the transmission direction of the sound waves as desired by the user can be determined according to the direction in which the knob is pointed.

(3) Monitoring the user's eye movement direction and/or sight direction, and determining the transmission direction of the signal desired by the user according to the direction of eye movement and/or the sight direction, For example, a camera can be disposed at the first vehicle to capture the user's face images when the user is prompted to input the sound wave transmission direction and determine the transmission direction of the signal desired by the user according to the user's eye movement direction and sight direction confirmed by the face image.

In another example, smart glasses worn by the user can capture the user's viewing direction, such as the user's head turning direction or eyeball movement direction.

(4) Monitoring the voice control information input by the user, and determining the transmission direction of signals desired by the user according to the voice control information.

A sound receiving device, such as a microphone, can be provided with the first vehicle for receiving the sound information sent by the user and performing speech analysis on the user's voice command, to determine the signal transmission direction.

In some embodiments, eye tracking or other methods can be employed to determine the transmission direction of the signals as desired by the user.

In implementations, those of ordinary skill in the art can select the manner of determining the transmission direction of signals according to actual needs, which are not limited in the embodiments of the present disclosure.

In some embodiments of the present disclosure, the transmission direction information may be obtained by monitoring actions of the user in real time. After obtaining the first target information and the transmission direction information input by the user, the process proceeds to step 102.

Step 102: Modulating the first target information onto the first signal.

In some embodiments of the present disclosure, the first signal comprises a sound wave signal, and a horn configured for directional transmitting of the sound wave signal is pre-installed on the first vehicle. After acquiring the first target information input by the user, the first target information may be modulated onto the first sound wave signal such that the first target information can be sent out through the first sound wave signal.

The methods for modulating the first target information to the first sound wave signal can adopt information modulation methods known to those of ordinary skill in the art. For example, any methods that can modulate the first target information onto the first sound wave signal can be applied to various embodiments of the present disclosure.

After the first target information is modulated onto the first sound wave signal, the process proceeds to step 103.

Step 103: Sending the first sound wave signal to the second vehicle according to the transmission direction information.

After modulating the first target information onto the first sound wave signal, directional transmission of the first sound wave signal is performed according to the acquired transmission direction information, such that the second vehicle in the transmission direction can receive the first sound wave signal.

Therefore, after the second vehicle analyzes the first sound wave signal, the first target information modulated on the first sound wave signal may be obtained, and the first target information is transmitted.

According to the method for directional transmitting of information from the first vehicle provided in some embodiments of the present disclosure, the first target information is modulated onto the sound wave signal by acquiring the first target information and the transmission direction information. The first sound wave signal is sent to the second vehicle according to the transmission direction information.

Various embodiments of the present disclosure can achieve directional communications between the first vehicle and the second vehicle according to the transmission direction information, not only realizing the directional communication between the vehicles, but also achieving simple and beneficial effects of directional communications between the vehicles.

Figure 2:
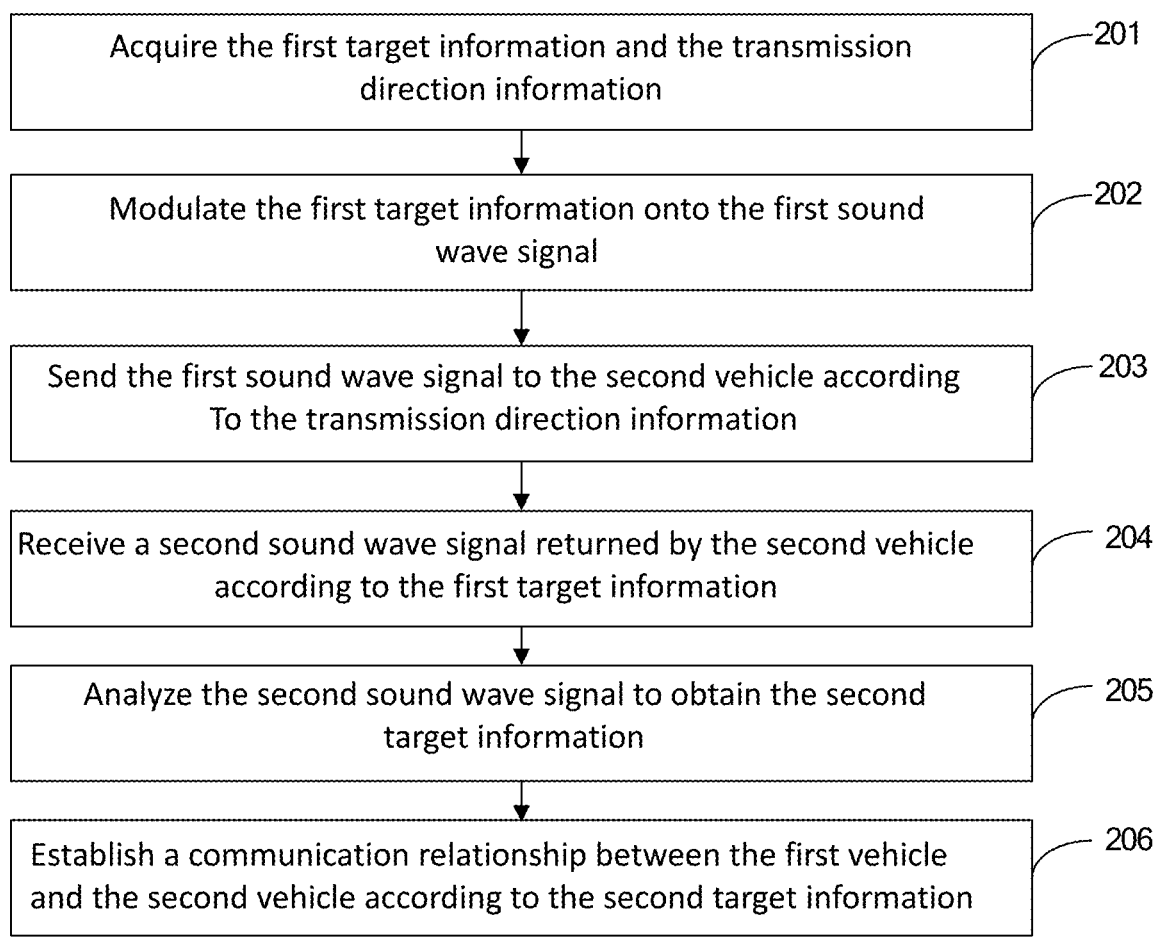
FIG. 2 is a flowchart of steps of a vehicle information directional transmission method according to some other embodiments of the present disclosure.

FIG. 2 is a flowchart of steps of a method for directional transmission of vehicle information according to some embodiments of the present disclosure.

In implementations, the method for directional transmission of information can be applied to a first vehicle, and can include the following steps.

Step 201: Acquiring the first target information and the transmission direction information.

Step 202: Modulating the first target information onto the first signal, such as a sound wave signal.

Step 203: Sending the first sound wave signal to the second vehicle according to the transmission direction information.

In the embodiments of the present disclosure, the foregoing steps 201 to 203 are similar to the implementations of steps 101 to 103 in the embodiments illustrated in FIG. 1, and therefore are not described in detail herein again.

Step 204: Receiving a second signal, such as a second sound wave signal, returned by the second vehicle according to the first target information.

Step 205: Analyzing the second sound wave signal to obtain the second target information.

In these embodiments of the present disclosure, after the second vehicle receives the first sound wave signal sent by the first vehicle, the first sound wave signal may be analyzed such that the first target information modulated onto the first sound wave signal is acquired. The first target information contains the current position information of the first vehicle.

After the user of the second vehicle receives the first target information sent by the user of the first vehicle, return information may need to be sent back to the user of the first vehicle. The return information may include, for example, the second target information.

The second target information can be modulated onto the second sound wave signal. The second sound wave signal can then be sent according to the current position information of the first vehicle included in the first target information, such that the first vehicle acquires the second sound wave signal returned by the second vehicle.

After receiving the second sound wave signal, the first vehicle can analyze the second sound wave signal to obtain the second target information modulated on the second sound wave signal.

After acquiring the second target information returned by the second vehicle, the acquired second target information may be displayed on a display screen disposed at the first vehicle. For example, the second target information may comprise text information, image information, video information, voice information, etc.

In the case that the second target information is voice information, the second target information may be played by sound such that the user of the first vehicle can obtain the second target information in real time.

After acquiring the second target information, the process proceeds to step 206.

Step 206: Establishing a communication relationship between the first vehicle and the second vehicle according to the second target information.

In the embodiments of the present disclosure, the second target information may include the information returned by the second vehicle user notifying the first vehicle user. The second target information may also include first position information of the second vehicle, first velocity information of the second vehicle, and first time information of the second vehicle, and/or a target identifier information, etc., when the second vehicle transmits the second sound wave signal.

The first vehicle may determine the relative position information of the second vehicle and the first vehicle according to the information contained in the second target information, so as to achieve communication between the two vehicles.

According to some embodiments, once the communication is established between two vehicles, users between two vehicles can communicate via one or more conventional approaches, such as radio communication, cellular phone communication, WiFi communication, Bluetooth communication, etc., and are not limited to the approach of establishing the communications, such as using the sound wave signal described above.

The following two specific implementations are described as examples.

In some implementations, step 206 described above may include the following sub-steps.

Sub-step S1: Acquiring a current, second position information of the first vehicle and a second time information of the first vehicle.

Sub-step S2: Calculating second position information of the second vehicle according to the second time information of the first vehicle, the first time information of the second vehicle, the first velocity information of the second vehicle, and the first position information of the second vehicle.

Sub-step S3: Determining relative position information of the second vehicle and the first vehicle according to the second position information of the first vehicle and the second position information of the second vehicle.

Sub-step S4: Establishing a communication relationship between the first vehicle and the second vehicle according to the relative position information.

In the embodiments of the present disclosure, the second target information includes the first position information of the second vehicle, the first speed information of the second vehicle, and the first time information of the second vehicle when the second vehicle transmits the second sound wave signal.

The current, second position information of the first vehicle and the current, second time information of the first vehicle can be obtained. The current, second position information of the second vehicle can be calculated according to the first time information of the second vehicle, the second time information of the first vehicle, the first speed information of the second vehicle, and the first position information of the second vehicle.

For example, the second time information t2 of the first vehicle−the first time information t1 of the second vehicle=time t from the second vehicle transmitting the second sound wave signal to the first vehicle receiving the second target information; the first speed information of the second vehicle s1*t=S2, i.e., displacement of the second vehicle.

The displacement of the second vehicle S2+first position information S1 of the second vehicle=current, second position of the second vehicle, such that the position of the second vehicle relative to the first vehicle can be determined based on the second position of the second vehicle and the second position of the first vehicle.

In some embodiments, step 206 can further include the following sub-steps.

Sub-step N1: Establishing a communication relationship between the first vehicle and the second vehicle according to the identifier information.

In the embodiments of the present disclosure, the identifier information may be a mobile phone number, an account of an APP system of the user terminal, such as a WeChat ID, or the like. In some other embodiments, the identifier information can be an identification such as an account in software or communication apps such as WhatsApp, Snapchat, Skype, QQ, Facebook, Twitter, or other Internet communication or social media software.

After the first vehicle determines the identifier of the second vehicle or the second vehicle determines the identifier information of the first vehicle, the communication between the first vehicle and the second vehicle can be directly established with the aid of 3G/4G base stations according to the identifier information.

The methods for directional transmitting information of a vehicle as illustrated in FIG. 2 according to some embodiments of the present disclosure can have one or more beneficial effects of the methods illustrated in FIG. 1.

In addition, it can be further determined the relative position information between the two vehicles according to the position information sent by the first vehicle and the second vehicle, thereby establishing communications between the first vehicle and the second vehicle, or establishing communications between the first vehicle and the second vehicle according to the identifier information in the transmission information, not only realizing the directional communications between the two vehicles, but also realizing a simple implementation approach.

Figure 3:
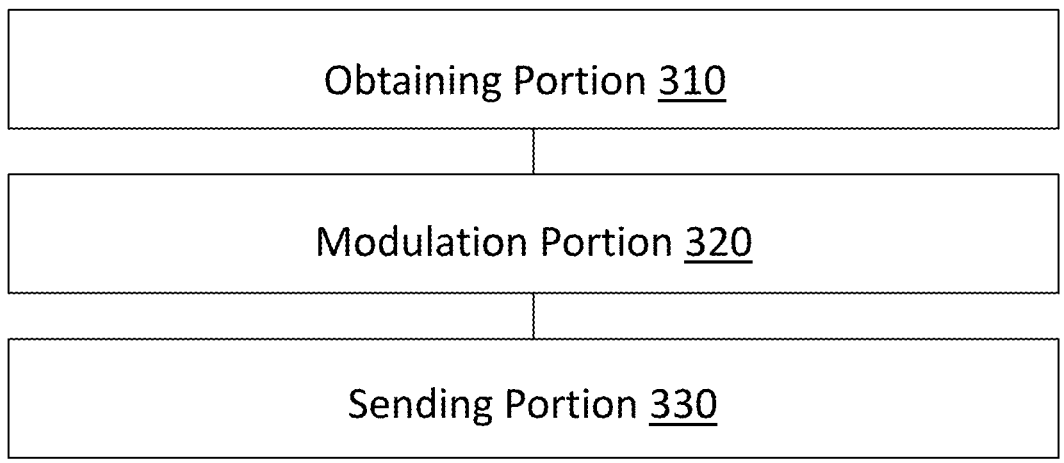
FIG. 3 is a schematic structural diagram of a device for directional transmission of vehicle information according to some embodiments of the present disclosure.

Referring to FIG. 3, a schematic structural diagram of a device for directional transmission of vehicle information according to some embodiments of the present disclosure is shown. For example, a navigation device can be included in a first vehicle, and can include the following portions.

An obtaining portion 310 can be included, and configured to acquire the first target information and the transmission direction information.

A modulation portion 320 can be included, and configured to modulate the first target information onto a first sound wave signal.

A sending portion 330 can be included, and configured to send the first sound wave signal to the second vehicle according to the transmission direction information.

In some embodiments, the device can further include the following portions or components.

A receiving portion can be configured to receive a second sound wave signal returned by the second vehicle according to the first target information.

An analyzing portion can be configured to analyze the second sound wave signal to obtain the second target information.

A communication relationship establishing portion can be configured to establish a communication relationship between the first vehicle and the second vehicle according to the second target information.

In some embodiments, the second target information includes: the first position information, the first speed information, and the first time information when the second vehicle transmits the second sound wave signal.

In some embodiments, the communication relationship establishing portion can includes the following sub-portions.

For example, a location and time acquisition sub-portion can be included, and configured to acquire the current second position information and the second time information of the first vehicle.

A second position calculation sub-portion can be configured to calculate the second position information of the second vehicle according to the second time information, the first time information, the first speed information, and the first position information.

A first relative position determining sub-portion can be configured to determine relative position information of the second vehicle and the first vehicle according to the second position information of the first vehicle and the second position information of the second vehicle.

A first communication relationship establishing sub-portion can be configured to establish a communication relationship between the first vehicle and the second vehicle according to the relative position information.

In some embodiments, the second target information includes identifier information, and the communication relationship establishing portion can include a second communication relationship establishing sub-portion, configured to establish a communication relationship between the first vehicle and the second vehicle according to the identifier information.

In some embodiments, the device can further include an on-screen display portion, configured to display the second target information on a display screen; and/or a playing portion, configured to play the second target information by voice.

In some embodiments, the acquisition portion 310 can include one or more of the following sub-portions.

A first sound wave radiation direction determining sub-portion, configured to monitor key control information input by the user, and determine the transmission direction of sound wave input by the user according to the key control information.

A second sound wave radiation direction determining sub-portion, configured to monitor user-entered knob control information, and determine the transmission direction of sound wave input by the user according to the knob control information.

A third sound wave radiation direction determining sub-portion, configured to monitor a user's eye movement direction and a line of sight direction, and determine the sound wave transmission direction input by the user according to the eyeball movement direction and the line of sight direction.

A fourth sound wave radiation direction determining sub-portion, configured to monitor the voice control information input by the user, and determine the transmission direction of the sound wave input by the user according to the voice control information.

In some embodiments, the first target information and the second target information can each include any one of the voice information, the text information, the picture information, or the video information, etc.

In some embodiments of the present disclosure, the first target information is modulated onto the sound wave signal by acquiring the first target information and the transmission direction information, and the first sound wave signal is sent to the second vehicle according to the transmission direction information.

Compared with conventional, at least some of the embodiments of the present disclosure can achieve the directional communication between the first vehicle and the second vehicle based on the transmission direction information, not only realizing the directional communications between vehicles, but also achieving simpler and more advantageous effects of directional communications between vehicles.

Figure 4:
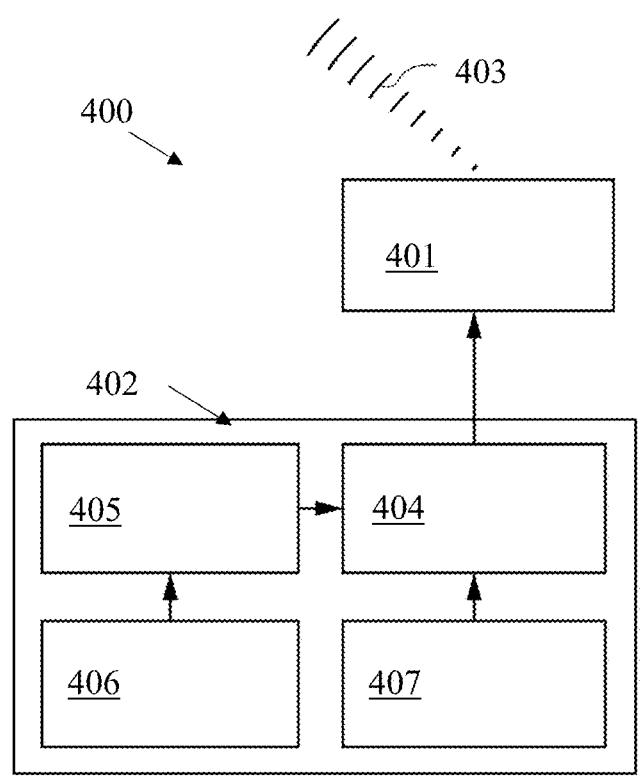
FIG. 4 is a block diagram illustrating a device for directional transmission of vehicle information with a sound wave signal, according to some embodiments of the present disclosure.

FIG. 4 is a block diagram illustrating an apparatus 400 for directional transmission of vehicle information with a signal, according to some embodiments of the present disclosure.

In some embodiments, the signal comprises a sound wave signal. In some other embodiments, the signal can comprise one or more of a light, infrared, ultrasound, radio frequency (RF), WiFi, Bluetooth, or other types of signals. In the following, a sound wave signal is used as an example for the signals, but it will be understood by those of ordinary skill in the art that various embodiments disclosed herein can employ other types of signals.

As shown, a signaling portion 401 can be driven by a signaling control portion 402, to transmit a signal 403. In the embodiment as illustrated, the signal 403 comprises a sound wave signal, and correspondingly the signaling portion 401 can be a horn portion, and the signaling control portion 402 can be a horn control portion.

The horn control portion 402 can include a signal drive portion (e.g., horn drive portion) or unit 404, a signal modulation portion 405, an information obtaining portion 406, and a direction obtaining portion 407.

The horn control portion 402 can be embedded in the vehicle, or integrated as part of a smart vehicle.

The horn drive portion 404 can provide a drive signal to the horn portion 401, to drive the horn portion to transmit the directional sound wave signal 403 containing information and towards a specified direction.

The signal modulation portion 405 can modulate the information to be transmitted to the sound wave signal 404, and provide the modulated information to the horn drive portion 404.

The information obtaining portion 406 can obtain the information to be transmitted, such as from the users, occupants, or other devices in the first vehicle, and provide such information to the signal modulation portion 405.

The direction obtaining portion 407 can obtain the specified direction, for example from the users, occupants, or other devices in the first vehicle, and provide such direction information to the horn drive portion 404 to thereby control the direction of the sound wave signal 403.

In some embodiments, one or more of the portions or functions such as the direction obtaining portion 407 can be realized with a smart apparatus such as a smart phone. As such, it should be understood that the horn control portion 402 can comprise one or more components or devices, such as the smart phone.

A first smart apparatus can be associated with a first vehicle, and a second smart apparatus can be associated with a second vehicle.

In some embodiments, the smart apparatus can be embedded in the vehicle, integrated with the smart vehicle, or be a portable device brought along by a user or occupant of the vehicle.

In some embodiments, the horn portion 401 can include one or more horns or speakers, a sound wave focusing device, or a steering structure configured to steer the one or more speakers and/or the sound wave focusing device to the specified direction. The steering structure can be, for example, a mechanical steering structure configured to mechanically steer the one or more speakers and/or the sound wave focusing device to the specified direction.

In some embodiments, the directional transmission of the sound wave signal can be realized with a sound wave form shaper, such as a sound wave focuser, a phase control array, etc., without the need for mechanically steering the direction of the one or more speakers or horns.

In some embodiments, the one or more horns or speakers comprise a plurality of speakers forming an array, and a plurality of ultrasound energy converters forming an array.

In some embodiments, the sound wave signal 403 comprises sound waves audible to human ears. In some embodiments, the sound wave signal 403 comprises ultrasound signals. In some embodiments, the sound wave signal 403 comprises infrasound or low-frequency signals.

In some embodiments, the signal modulation portion 405 is configured to modulate the signals with one or more of: dual-tone multifrequency modulation, frequency shifting keying modulation, phase shifting keying modulation, amplitude keying modulation, pulse amplitude encoding modulation, etc.

In some embodiments, in the cases that the modulation by the signal modulation portion 405 involves frequency, it may be needed to increase spacing between neighboring frequencies. For example, the spacing should be larger than 4 times the Doppler frequency shift corresponding to the speed limit (considering the relative motion speed between vehicles traveling in opposite directions).

Although in various embodiments roadable automobiles are used as an example of the "vehicle," and correspondingly the speed can refer to the road speed, in some other embodiments, other types of vehicles can be employed. Different types of vehicles can include, for example, boats or ships, aircraft such as airplanes, helicopters, quadcopters, unmanned aerial vehicles (UAVs), passenger-carrying UAVs, etc.

In some embodiments, the information obtaining portion 406 can obtain information through one or more of: key inputs, voice recognition, or communications with a smart device such as a smart phone in the first vehicle. For example, a user or occupant's smart phone can realize one or more of the above steps, while interacting with devices pre-installed in the vehicle, such as the horns and speakers.

In some embodiments, the direction obtaining portion 407 can obtain the specified signal transmission direction through one or more of: key inputs, knob or dial control, voice command, eye movement tracking, or communications with a smart device such as a smart phone in the first vehicle.

Figure 5:
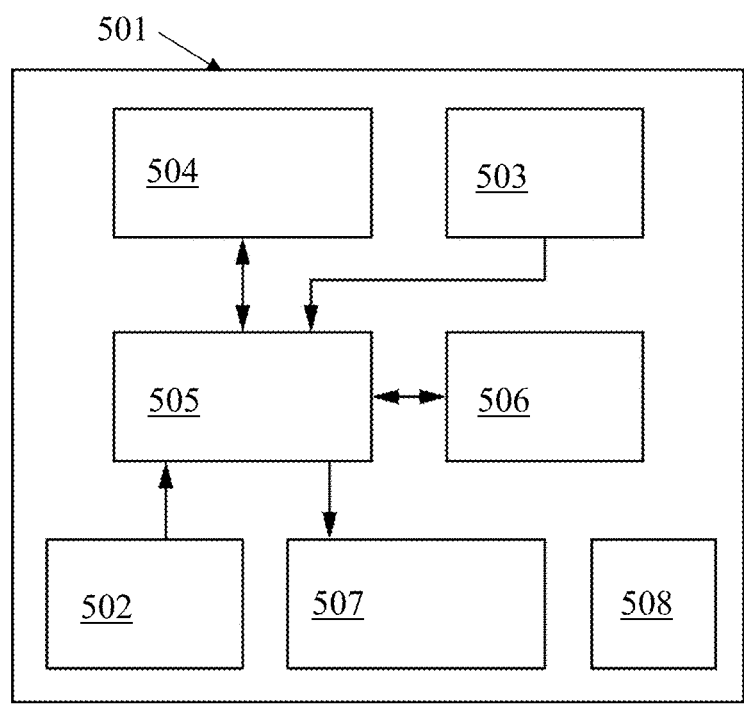
FIG. 5 is a block diagram illustrating a smart apparatus that can be carried by a vehicle according to some embodiments.

FIG. 5 is a block diagram of a smart apparatus 501 configured to function with a vehicle according to some embodiments.

In some embodiments, the smart apparatus 501 can be a smart phone, a tablet computer, a personal digital assistant, etc., carried by an occupant of the vehicle, or let in the vehicle by its user.

In some embodiments, the smart apparatus 501 can be part of the vehicle, such as a removable auxiliary apparatus of the vehicle, or integrally formed with the vehicle as part of the vehicle's smart control system.

In some embodiments, the smart apparatus 501 can include a signal (such as sound wave signal) pickup portion 502, a positioning portion 503, a wireless communication portion 504, an information processing portion 505, a storage portion 506, an information output portion 507, and a power supply 508.

In some embodiments, the signal pickup portion 502 can receive the signals (such as sound wave signals) 403 and convert the signals 403 into electrical signals for feeding the information processing portion 505.

The wireless communication portion 504 can communicate with other smart devices, or with one or more wireless base stations.

The positioning portion 503 can provide position information of the smart apparatus 501.

The information processing portion 505 can process various types of data and information flows involving the smart apparatus 501.

The storage portion 506 can store one or more of store data, codes, programs, apps, instructions, software product, etc., to realize one or more functions and methods disclosed herein.

The information output portion 507 can output information to one or more of a user, an occupant, or another device in the vehicle in an understandable manner.

The power supply 508 can provide power to the various portions, blocks, or modules of the smart apparatus 501.

In some embodiments, the signal pickup portion 502 can comprise one or more of a microphone, a microphone array, an ultrasound energy converter, an RF, WiFi, Bluetooth receiver, an optical or infrared sensor, etc.

The signal pickup portion 502 can be disposed inside the vehicle, or partially or completely outside the vehicle such as at an outer surface of the vehicle. The signal pickup portion 502 can be coupled, wirelessly or through cable(s), with other portions of the smart apparatus 501.

The positioning portion 503 can include one or more of a satellite-based (such as GPS, BeiDou, etc.) navigation device, an inertial navigation device, a mobile communication positioning device, etc.

In some embodiments, the wireless communication portion 504 can communicate with other smart devices, or with one or more wireless base stations through short-range wireless communication, near-field communication (NFC), WiFi communication, Bluetooth communication, mobile communication, or satellite-based communication, etc.

In some embodiments, the information processing portion 505 can comprise one or more of a microcontroller, a digital signal processor (DSP), a field-programmable gate array (FPGA), an embedded processor, a central processing unit (CPU), etc.

In some embodiments, the storage portion 506 can store an identifier of the smart apparatus 501. The identifier can be a unique identifier for each smart apparatus 501.

In some embodiments, the information output portion 507 can comprise one or more of a display screen, a signage, an LED indicator, a speaker, etc.

In some embodiments, the power supply 508 can comprise one or more of a battery, a cigarette lighter, an onboard diagnostic (OBD) interface, etc.

Figure 6:
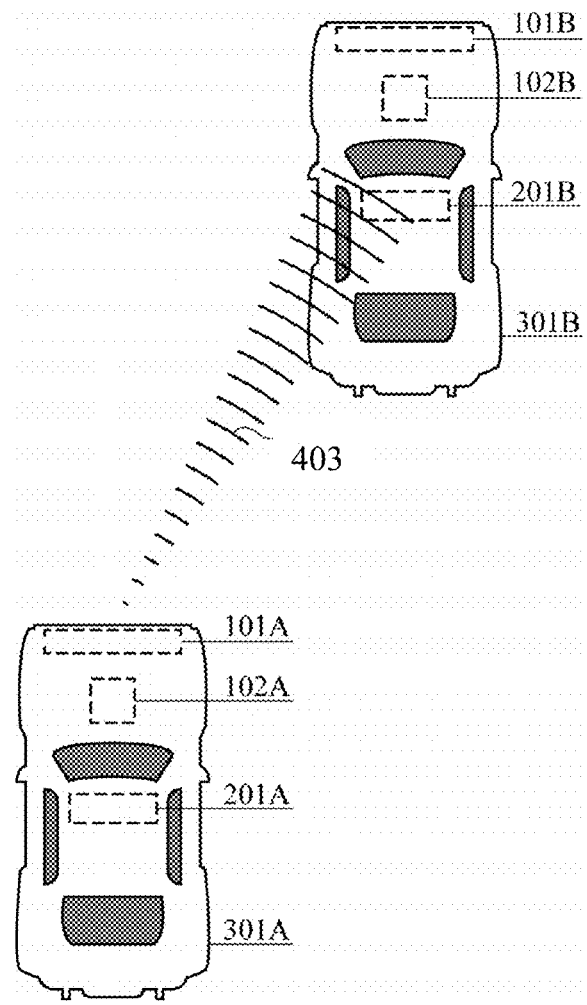
FIG. 6 illustrates an implementation of the methods and devices according to some embodiments.

FIG. 6 illustrates an implementation of the systems, methods, and devices according to some embodiments.

As shown, the first vehicle 301A performs a directional communication towards the second vehicle 301B using sound wave signals 403.

The first vehicle 301A has a first horn portion 101A, a first horn control portion 102A, and a first smart apparatus 201A. The second vehicle 301B has a second horn portion 101B, a second horn control portion 102B, and a second smart apparatus 201B.

Figure 7:
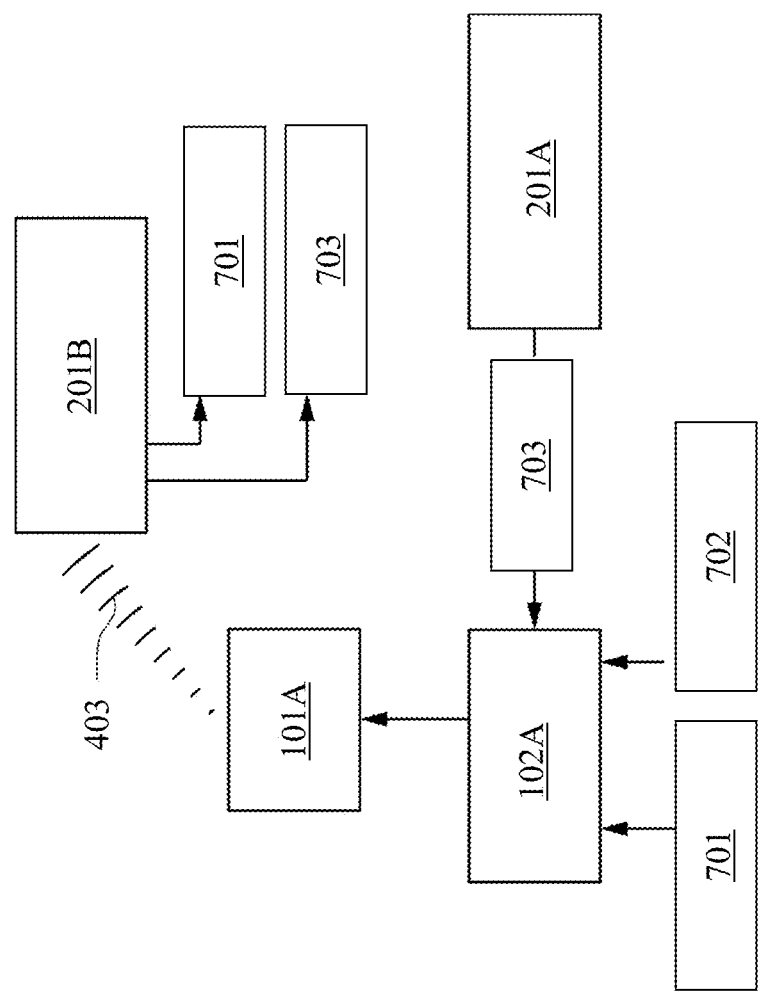
FIG. 7 is a schematic diagram illustrating an application of the methods and devices according to some embodiments.

FIG. 7 is a schematic diagram illustrating an application of the methods and devices according to some embodiments.

When the first vehicle 301A needs to send a directional signal to the second vehicle 301B, one or more of a user, an occupant, or a device of the first vehicle 301A can input the desired information 701 and the specified direction 702 to the first horn control portion 102A.

The first horn control portion 102A reads from the first smart apparatus 201A the current position information 703 of the first vehicle 301A. The first horn control portion 102A sends the desired information 701 and the position information 703 through the first horn portion 101A, according to the specified direction 702 in the form of the sound wave signals 403.

The second smart apparatus 201B of the second vehicle 201B receives the sound wave signal 403, demodulates the desired information 701 and the position information 703, and inputs the demodulated information to one or more of a user, an occupant, or a device of the second vehicle 201B.

Figure 8:
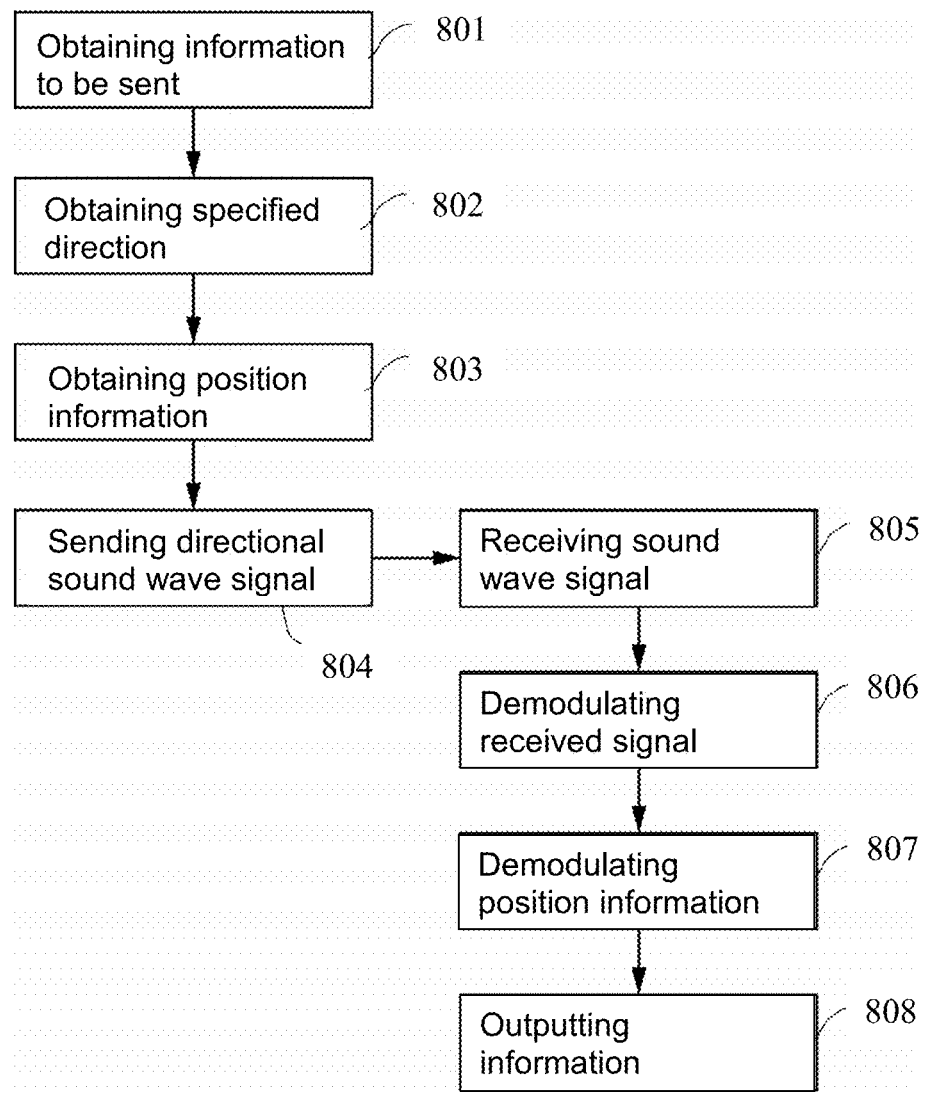
FIG. 8 is a flow diagram illustrating steps in the process of FIGS. 6 and 7.

FIG. 8 is a flow diagram illustrating steps in the process of FIGS. 6 and 7. Steps 801, 802, 803 can be realized with the first horn control portion 102A of the first vehicle 301A. Steps 804 can be realized with the first horn portion 101A of the first vehicle 301A. Steps 805, 806, 807, 808 can be realized with the smart apparatus 201B of the second vehicle 301B.

In some embodiments, the position information demodulated in step 807 is a position of the first vehicle 301A when sending out the sound wave signal 403. To have the user, occupant, or device of the second vehicle 301B better understand the relative position of the first vehicle 301A, in step 803 the velocity information and corresponding time stamp of the first vehicle 301A can be obtained at the same time. Such information can be obtained, for example, using the satellite-based or inertial navigation systems.

As such, in step 807, based on the velocity (e.g., speed) information and corresponding time stamp of the first vehicle 301A, the velocity of the second vehicle 301B and the current time, the relative positions between the first vehicle 301A and second vehicle 301B can be more accurately calculated.

Figure 9:
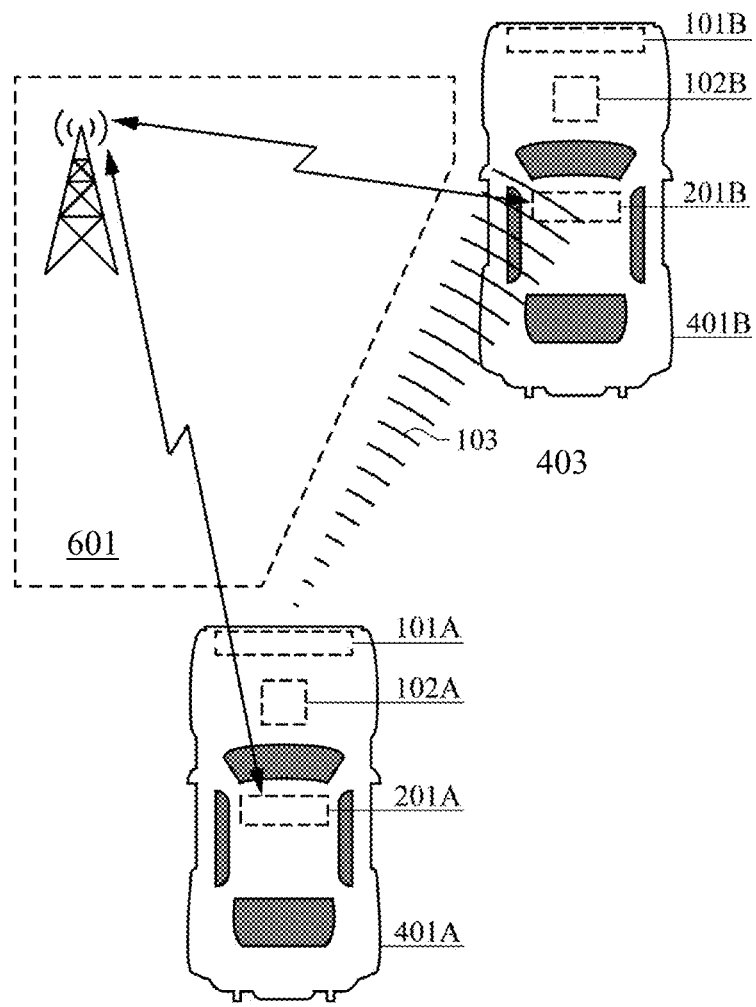
FIG. 9 illustrates an implementation of the methods and devices according to some other embodiments.

FIG. 9 illustrates an implementation of the systems, methods, and devices according to some other embodiments, showing that the first vehicle 301A sends directional sound wave signals to the second vehicle 301B and the subsequent directional wireless communications.

As shown, the first vehicle 301A carries the first horn portion 101A, the first horn control portion 102A, and the first smart apparatus 201A. The second vehicle 301B carries the second horn portion 101B, the second horn control portion 102B, and the second smart apparatus 201B.

The second smart apparatus 201B of the second vehicle 301B and the first horn portion 101A of the first vehicle 301A can communicate through a wireless communication system 601.

Figure 10:
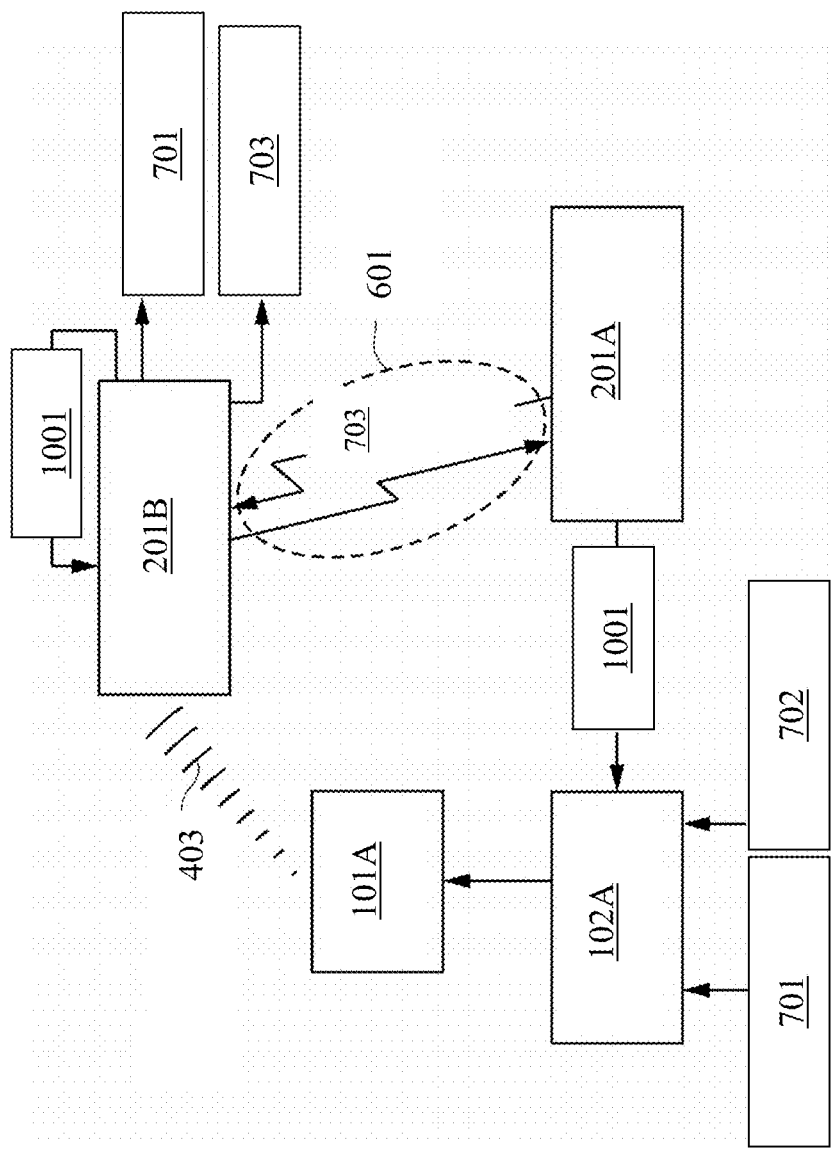
FIG. 10 is a schematic diagram illustrating an application of the methods and devices shown in FIG. 9.

FIG. 10 is a schematic diagram illustrating an application of the systems, methods and devices shown in FIG. 9.

As shown, when the first vehicle 301A needs to perform a directional communication with the second vehicle 301B, the user, occupant or device in the first vehicle 301A can input the to-be-sent information 701 and the specified direction 702 to the horn control portion 102A, and the horn control portion 102A of the first vehicle 301A can read the identifier 1001 of the smart apparatus 201A of the first vehicle.

The horn control portion 102A sends the information 401 and the identifier 1001 through the first horn portion 101A of the first vehicle according to the specified direction 702, in the form of the sound wave signals 403. The second smart apparatus 201B of the second vehicle receives the sound wave signals 403, demodulates the information 701 and the identifier 1001, and establishes a wireless communication 601 with the first smart apparatus 201A of the first vehicle based on the identifier 701, obtains the position information 703, and outputs such information together with the information 701 to the user, occupant, or device of the second vehicle 301B.

In some embodiments, the wireless communication 601 comprises one or more of: short-range wireless communications such as Bluetooth, DSRC, ZigBee; mobile communications such as 3G, 4G; or satellite-based communications. The wireless communication 601 can be a direct communication, or can be an indirect communication based on base stations or other signal transceivers.

Figure 11:
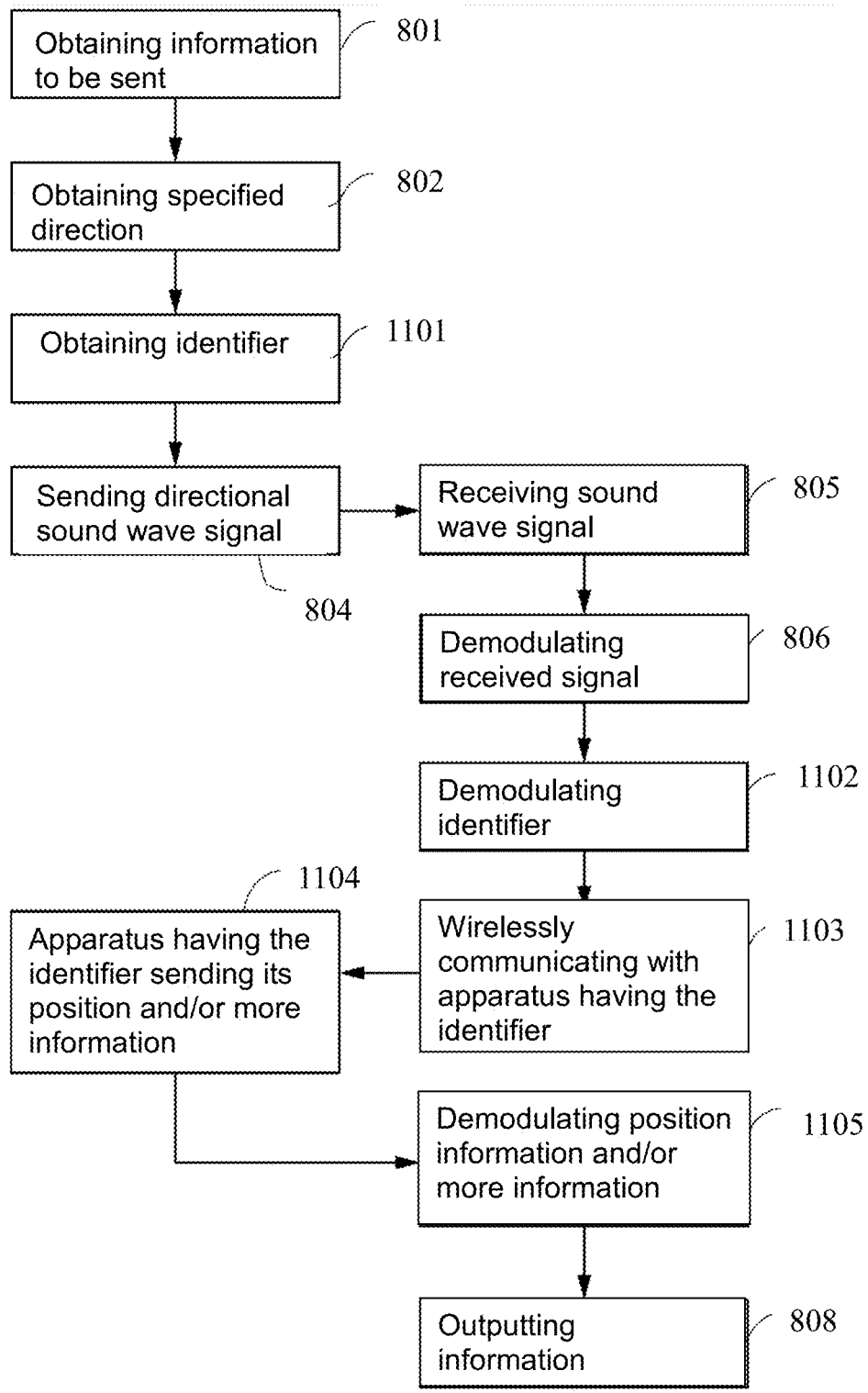
FIG. 11 is a flow diagram illustrating steps in the process of FIGS. 9 and 10.

FIG. 11 is a flow diagram illustrating steps in the process of FIGS. 9 and 10, wherein steps 801, 802, 1101 can be realized with the first horn control portion 102A of the first vehicle; step 804 can be realized with the first horn portion 101A of the first vehicle; steps 805, 805, 1102, 1103, 1105, 808 can be realized with the smart apparatus 201B of the second vehicle; step 804 can be realized with the smart apparatus 201A of the first vehicle.

In some embodiments, step 1103 can be realized with, for example, identifying with address and/or terminal in short-range communications, identifying with SIM cards or unique identification (UID) in mobile communications, etc.

In some embodiments, the information sent in step 1104 can include, in addition to the position information, one or more of: voice communication information, textual information, picture information, video information, etc.

Figure 12:
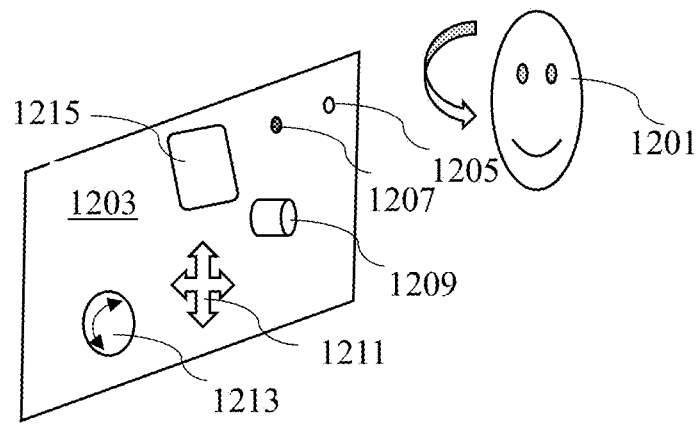
FIG. 12 illustrates a user or occupant interacting with controls in a vehicle.

FIG. 12 illustrates a user or occupant 1201 interacting with controls in a vehicle, such as those on a dashboard 1203. The dashboard 1203 can include, for example, a video camera 1205 configured to capture the user or occupant 1201's head, face, and/or eye movements. Such movements can be employed specify the desired direction of transmission of the sound wave signal 403, as described above.

The dashboard 1203 can further comprise one or more microphones 1207 configured to capture a voice from the user or occupant 1201, to thereby realizing voice commanding.

The dashboard 1203 can further comprise one or more of a knob 1209, a keypad 1211, a dial 1213 configured to receive input from the user or occupant 1201 for the desired direction of transmission of the sound wave signal 403 as described above.

A display screen and/or speaker 1215 can also be included in the dashboard 1203, or can be the existing screen(s) and/or speaker(s) in the vehicle's audio or navigation system, and configured to display information to the user, and convey information through a sound or synthetic voice.

In some embodiments, the one or more controls or devices can be part of a portable device instead of those integrated on the dashboard 1203. For example, a smart phone, personal digital assistant (PDA), tablet computer, etc. of the user can realize one or more of the above functions.

In another aspect, a vehicle is provided, which is capable of the directional communications described above.

In some embodiments, the vehicle is a smart vehicle, with the smart apparatus as described above integrally formed as part of the smart vehicle.

In some other embodiments, the smart apparatus can be separately provided, and can function with various types of vehicles.

Figure 13:
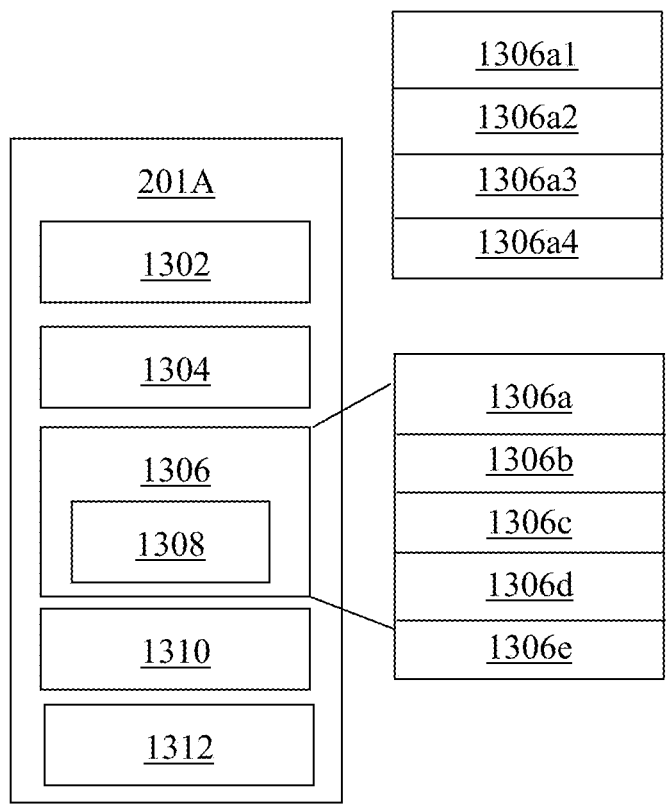
FIG. 13 is a schematic diagram illustrating a structure of the first smart apparatus.

In some embodiments, as illustrated in FIG. 13, the first smart apparatus 201A comprises a first location portion 1302 configured to acquire position information of the first vehicle as the first target information; and a first direction acquisition portion 1304 configured to acquire the transmission direction information.

In some embodiments, the first smart apparatus 201A comprises a first wireless communication portion 1306, having an identifier 1308 as the target information.

In some embodiments, the first smart apparatus 201A further comprises a receiving portion 1310 configured to receive a second signal returned by the second vehicle according to the first target information; and an analyzing portion 1312 configured to analyze the second signal to obtain a second target information.

In some embodiments, the first position information of the first vehicle and the identifier are the target information.

In some embodiments, the identifier comprises at least one of a mac address or an IP address.

Figure 14:
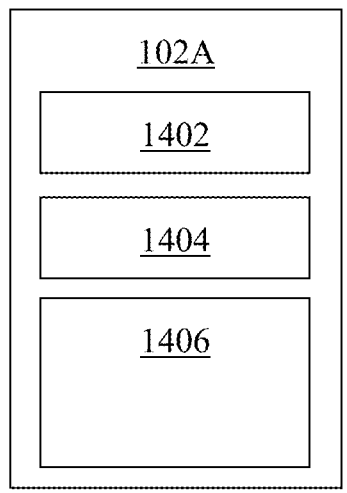
FIG. 14 is a schematic diagram illustrating a structure of the first horn control portion.

In some embodiments, as illustrated in FIG. 14, the first horn control portion 102A comprises: an acquisition sub-portion 1402 configured to acquire the first target information and the transmission direction information from the first smart apparatus 201A; a modulation sub-portion 1404 configured to modulate the first target information onto the first sound wave signal; and a sending sub-portion 1406 configured to send the first sound wave signal to the second vehicle based on the transmission direction information.

Figure 15:
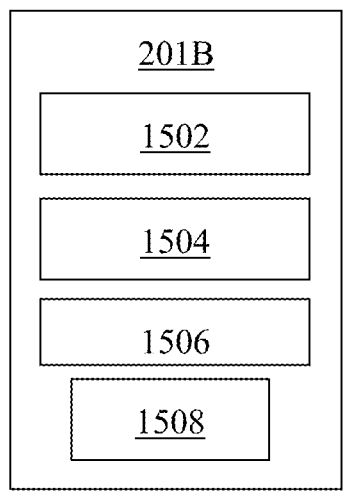
FIG. 15 is a schematic diagram illustrating a structure of the second smart apparatus.

In some embodiments, as illustrated in FIG. 15, the second smart apparatus 201B comprises: a second sound pickup portion 1502; and a second demodulation portion 1504.

In some embodiments, the second smart apparatus 201B further comprises: a second wireless communication portion 1506.

In some embodiments, the second smart apparats 201B further comprises: a second location portion 1508; and a storage device 1510.

In some embodiments, the first wireless communication portion 1306 comprises: a location and time acquisition sub-portion 1306a configured to acquire current second position information and second time information of the first vehicle; a second position calculation sub-portion 1306b configured to calculate second position information of the second vehicle according to the second time information of the second vehicle, the first time information of the second vehicle, the first speed information, and the first position information of the second vehicle; a first relative position determining sub-portion 1306c configured to determine a relative position information of the second vehicle and the first vehicle according to the second position information of the first vehicle and the second position information of the second vehicle; and a first communication establishing sub-portion 1306d configured to establish a communication between the first vehicle and the second vehicle according to the relative position information.

In some embodiments, the second target information comprises a target identifier.

In some embodiments, the first wireless communication portion further comprises: a second communication establishing sub-portion 1306e configured to establish a communication between the first vehicle and the second vehicle according to the identifier information.

In some embodiments, the location and time acquisition sub-portion 1306a comprises at least one of: a first signal direction determining sub-portion 1306a1, configured to monitor a key control information input by a user, and determine a transmission direction according to the key control information; a second signal direction determining sub-portion 1306a2 configured to monitor a user-entered knob control information, and determine the transmission direction according to the knob control information; a third signal direction determining sub-portion 1306a3 configured to monitor a user's eye movement direction and a sight direction, and determine the transmission direction according to the eye movement direction and the sight direction; or a fourth signal direction determining sub-portion 1306a4 configured to monitor a voice command input by the user, and determine the transmission direction according to the voice command.

In some embodiments, a processing circuit may be employed to execute instructions to realize various methods and functions according to various embodiments disclosed herein. For example, the first location portion 1302, the first direction acquisition portion 1304, the first wireless communication portion 1306, the acquisition sub-portion 1402, the modulation sub-portion 1404, the sub-portion 1406, the second sound pickup portion 1502, the second demodulation portion 1504, the second wireless communication portion 1506, and the second location portion 1508 and the sub-portions described above can be realized with one or more processing circuits.

In some embodiments, the processing circuit can have a modular configuration and is sometimes referred to as a processing module. In some other embodiments, the processing circuit does not necessarily have a modular configuration.

For example, the processing circuit may be implemented by a processor that performs logic operations, such as a central processing unit (CPU), a field programmable logic array (FPGA), a digital signal processor (DSP), a microcontroller (MCU), or Application-Specific Integrated Circuits (ASICs), and other devices with data processing capabilities and/or program execution capabilities.

It will be readily understood that the processing circuit may include, or be coupled with memory, on which a computer program product is stored. For example, the storage device 1510 can comprise the memory, and the memory may include various forms of computer-readable storage media, such as volatile memory and/or non-volatile memory. Volatile memory may include, for example, random access memory (RAM) and/or cache. Non-volatile memory may include, for example, read-only memory (ROM), hard disk, EPROM, USB memory, flash memory, and other non-transitory computer-readable medium.

In some embodiments, the first target information can further include at least one of the voice information, the text information, the picture information, or the video information. Accordingly, the system further comprises at least one of a microphone, a keypad of touch screen, or a camera to generate such information.

Similarly, the second target information can further include at least one of the voice information, the text information, the picture information, or the video information.

Although various embodiments of the present disclosure employ a sound wave signal as an example of the first signal, other types of signals can be employed according to other embodiments.

In the case of the first signal comprising a first sound wave signal, the sending portion comprises one or more speakers or horns to generate the first sound wave signal.

To provide direction control of the sound wave signal, the sending portion can further include a steering structure configured to mechanically steer the one or more speakers or horns according to the transmission direction information.

In some implementations, the sending portion can further include a sound wave focuser configured to direct the sound wave signal according to the transmission direction information.

In another aspect, a non-transitory computer-readable storage medium is provided. One or more computer instructions can be stored on the storage medium such as the memory, and the processor can run the computer instructions to realize various functions. Various applications and various data may also be stored in a computer-readable storage medium, such as various data used or generated by the applications.

The instructions, when executed by the processor or processing circuit, can realize directional communications among vehicles. The instructions can include, for example, obtaining first target information and transmission direction information from a first vehicle; modulating the first target information onto a first sound wave signal; and sending the first sound wave signal to a second vehicle according to the transmission direction information.

In some embodiments, after the sending the first signal to the second vehicle according to the transmission direction information, the instructions further include receiving a second signal returned by the second vehicle according to the first target information; analyzing the second signal to obtain second target information; and establishing a communication between the first vehicle and the second vehicle according to the second target information.

In some embodiments, after the analyzing the second signal to obtain the second target information, the instructions further include: displaying the second target information on a display screen; and/or playing the second target information by voice.

Such displaying and/or playing operations can be realized by, for example, onboard screen of the vehicle, onboard speaker of the vehicle, or other devices embedded in the vehicle or integrated with the vehicle, which can be a smart vehicle.

Alternatively, such operations can be realized on a portable device or terminal, such as the user's smart phone, which can be wirelessly connected with the vehicle's onboard electronics system such as the various control portions and sub-portions, including the horn control portion, the vehicle's onboard navigation system, and the vehicle's self-driving controls.

In the case of self-driving vehicles, the relative positions between vehicles can be more readily obtained, for example using onboard radars, ultrasound detectors, or cameras. The directional control of the sound wave signal can also be integrated with the vehicle's self-driving functions, such that the direction of the sound wave signal can be automatically controlled together with the vehicle's speed and direction of movement during its self-driving mode.

In some embodiments, the instructions of obtaining the first target information and the transmission direction information from the first vehicle include at least one of: monitoring a key control input by a user, and determining the transmission direction according to the key control; monitoring a knob control input by the user, and determining a transmission direction according to the knob control; monitoring the user's eye movement direction and a sight direction, and determining the transmission direction according to the eye movement direction and the sight direction; or monitoring a voice command input by the user, and determining the transmission direction according to the voice command.

In the foregoing method embodiments, for the sake of simplified descriptions, they are expressed as a series of action combinations. However, those of ordinary skill in the art will understand that the present disclosure is not limited by the described action sequence.

According to some other embodiments of the present disclosure, some steps can be performed in other orders, or simultaneously.

In addition, those of ordinary skill in the art will also understand that the embodiments described in the specification are just some of the embodiments, and the involved actions and portions are not necessarily all required to realize the functions of the various embodiments.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion such that a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, the commodity, or the device including the element.

The foregoing has provided a detailed description on a vehicle information directional transmission method and a vehicle information directional transmission device according to some embodiments of the present disclosure. Specific examples are used herein to describe the principles and implementations of some embodiments. The description is only used to help understanding some of the possible methods and concepts. Meanwhile, those of ordinary skill in the art may change the specific implementation manners and the application scope according to the concepts of the present disclosure. The contents of this specification therefore should not be construed as limiting the disclosure.

In the descriptions, with respect to server(s), device(s), group(s), system(s), terminal(s), file(s), etc., in some occurrences singular forms are used, and in some other occurrences plural forms are used in the descriptions of various embodiments. It should be noted, however, the single or plural forms are not limiting but rather are for illustrative purposes. Unless it is expressly stated that a single server, device, group, system, terminal, or file etc. is employed, or it is expressly stated that a plurality of servers, devices, groups, systems, terminals, or files, etc. are employed, the server(s), device(s), group(s), system(s), terminal(s), file(s), etc. can be singular, or plural.

In some of the embodiments described below, a communication connection can be established among various devices such as terminals and servers. The communication connection may include a connection through a wireless network, a wired network, and/or any combination of a wireless network and a wired network.

The network may include a local area network (LAN), the Internet, a telecommunications network, an internet of things (IoT) and/or telecommunications-network-based IoT, and/or any combinations of the above networks.

For example, the wired network may employ wires, twisted pair wires, coaxial cables, or optical fiber transmissions to transmit information. In some other examples, the wireless network may employ a WWAN mobile communication network, Bluetooth, Zigbee, or WiFi.

Each module, unit, block, portion, component, or circuit portion can be provided with a communication connection circuit to complete a communication connection, to thereby perform a communication function.

Those of ordinary skill in the art will recognize that the example devices, device units, portions, components, modules, and algorithm steps described in conjunction with the embodiments disclosed herein can be implemented with hardware or a combination of computer software and hardware. Whether these functions are realized and performed using hardware and/or software depends on the specific applications and design constraints/choices. Those of ordinary skill in the art will also recognize that using different methods to implement the described functions for each specific application is also within the scope of the present disclosure.

Based on various embodiments of the present disclosure, the disclosed apparatuses, devices, and methods may be implemented in other manners. For example, the abovementioned terminals and devices are only of illustrative purposes, and other types of terminals and devices can employ the methods disclosed herein.

Dividing the terminal or device into different "portions," "modules," "components," or "blocks" merely reflect various logical functions according to some embodiments, and actual implementations can have other divisions of "portions," "modules," "components" or "blocks" realizing similar functions as described above, or without divisions. For example, multiple portions, modules, components, or blocks may be combined or can be integrated into another system. In addition, some features can be omitted, and some steps in the methods can be skipped.

Moreover, the illustrated or described mutual coupling between devices, portions, modules, components, such as direct coupling or communicative connection, can be through interfaces, devices, or functional blocks. Such a coupling can be electrical, mechanical, or have other forms.

In some embodiments, each functional portion in various embodiments of the present disclosure may be integrated in one processing circuit such as a processor. In some other embodiments, each portion can exist alone physically, or two or more portions may be integrated into one block or unit.

The functions as described above according to various embodiments of the present disclosure, if implemented in the form of software functional blocks and sold or used as a stand-alone product, may be stored in a computer-readable storage medium. Based on such understanding, some of the technical solutions of the present disclosure can be embodied in the form of a software product stored in a storage medium, including a plurality of instructions that are used to cause a computer device (which may be a personal computer, a mobile terminal, a server, or a network device, etc.) to perform all or part of the steps of the methods described in the various embodiments of the present disclosure.

Those of ordinary skill in the art will recognize that the functional blocks, methods, units, devices, and systems described in the present disclosure may be integrated or divided into different combinations of systems, units, devices, and functional blocks. Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this disclosure may be performed at the same time.

In some embodiments, a software or program code is provided to realize the method described above. The software or program code can be stored on any type of computer-readable medium or memory, such as a storage device including a disk or hard drive. The computer-readable medium may include a computer-readable medium or memory, such as computer-readable media that store data for short periods of time such as register memory, processor cache and RAM. The computer-readable medium may also include non-transitory media or memory, such as secondary or persistent long-term storage, such as ROM, optical or magnetic disks, compact-disc read only memory CD-ROM, flash drives such as USB drives, for example.

The computer-readable media may also be any other volatile or non-volatile storage systems. The computer-readable medium may be considered a computer-readable storage medium, a tangible storage device, or other article of manufacture, for example. The software instructions can be stored in the computer-readable media, and also be contained in, and provided as, an electronic signal, for example in the form of software as a service (SaaS) delivered from a server (e.g., a distributed system and/or a cloud computing system).

Those of ordinary skill in the art will appreciate that the modules, circuits, units, portions, or components in the devices provided by various embodiments described above can be configured in the one or more devices described above. They can also be located in one or multiple devices that is (are) different from the example embodiments described above or illustrated in the accompanying drawings. For example, the modules, circuits, units, portions, or components in various embodiments described above can be integrated into one module or divided into several sub-modules.

The numbering of the various embodiments described above are only for the purpose of illustration, and do not represent preference of embodiments.

Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" or "processing circuit" can be employed to realize some of the functions, devices, circuits, or methods described above, and can include any suitable hardware and/or software system, mechanism or component that processes data, signals or other information. A processor or processing circuit may include a system with a general-purpose central processing circuit, multiple processing circuits, dedicated circuitry for achieving functionality, or other systems.

Processing need not be limited to a geographic location, or have temporal limitations. For example, a processor may perform its functions in "real-time," "offline," in a "batch mode," etc. Portions of processing may be performed at different times and at different locations, by different (or the same) processing systems. Various embodiments disclosed herein can be realized via hardware and/or software, such as a computer program stored on a memory.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A system configured for vehicle communication, comprising:
    a first smart apparatus associated with a first vehicle having a first horn and configured to acquire a first target information and a transmission direction information;
    a first horn control portion embedded in the first vehicle and configured to control the first horn in the first vehicle to send a first sound wave signal modulated by the first target information to a second vehicle based on the transmission direction information; and
a second smart apparatus associated with the second vehicle and configured to receive the first sound wave signal and demodulate the first sound wave signal to obtain the first target information;
wherein the first smart apparatus comprises:
a first location portion configured to acquire first position information of the first vehicle;
a first wireless communication portion having an identifier;
a first direction acquisition portion configured to acquire the transmission direction information;
wherein the first target information comprises the first position information of the first vehicle and the identifier;
wherein the identifier comprises at least one of a mac address or an IP address;
wherein the second smart apparatus comprises:
a second sound pickup portion configured to receive the first sound wave signal;
a second demodulation portion configure to demodulate the first sound wave signal to obtain the first target information; and
a second wireless communication portion configured to communication with the first wireless communication portion;
wherein the first smart apparatus further comprises:
a receiving portion configured to receive a second signal returned by the second vehicle according to the first target information; and
an analyzing portion configured to analyze the second signal to obtain a second target information;
wherein the second target information comprises: first position information of the second vehicle, first speed information of the second vehicle, and first time information of the second vehicle when the second vehicle transmits the second signal.

2. The system according to claim 1, wherein the first smart apparatus comprises:
a first location portion configured to acquire first position information of the first vehicle as the first target information; and
a first direction acquisition portion configured to acquire the transmission direction information.

3. The system according to claim 1, wherein the first smart apparatus comprises:
a first wireless communication portion having an identifier as the first target information; and
a first direction acquisition portion configured to acquire the transmission direction information.

4. The system according to claim 1, wherein the first horn control portion comprises:
an acquisition sub-portion configured to acquire the first target information and the transmission direction information from the first smart apparatus;
a modulation sub-portion configured to modulate the first target information onto the first sound wave signal; and
a sending sub-portion configured to send the first sound wave signal to the second vehicle based on the transmission direction information.

5. The system according to claim 4, wherein the second smart apparatus comprises:
a second sound pickup portion configured to receive the first sound wave signal; and
a second demodulation portion configured to demodulate the first sound wave signal to obtain the first target information.

6. The system according to claim 1, wherein the first wireless communication portion comprises:
a location and time acquisition sub-portion configured to acquire second position information of the first vehicle and second time information of the first vehicle;
a second position calculation sub-portion configured to calculate second position information of the second vehicle according to the second time information of the first vehicle and the second target information;
a first relative position determining sub-portion configured to determine a relative position information of the second vehicle and the first vehicle according to the second position information of the first vehicle and the second position information of the second vehicle; and
a first communication establishing sub-portion configured to establish a communication between the first vehicle and the second vehicle according to the relative position information.

7. The system according to claim 1, wherein the second target information further comprises a target identifier.

8. The system according to claim 7, wherein the first wireless communication portion comprises:
a second communication establishing sub-portion configured to establish a communication between the first vehicle and the second vehicle according to the target identifier.

9. The system according to claim 8, further comprising:
an on-screen display portion configured to display the second target information on a display screen; and/or
a playing portion configured to play the second target information by voice.

10. The system according to claim 4, wherein:
the sending sub-portion comprises a plurality of speakers forming an array; and
the array comprises a phase control array configured to generate the sound wave signal with specified direction according to the transmission direction information.

11. A method for vehicle communication with the system according to claim 1, comprising:
obtaining the first target information and the transmission direction information from the first vehicle;
modulating the first target information onto the first sound wave signal; and
sending the first sound wave signal to the second vehicle according to the transmission direction information.

12. The method according to claim 11, further comprising, after the sending the first signal to the second vehicle according to the transmission direction information:
receiving a second signal returned by the second vehicle according to the first target information;
analyzing the second signal to obtain second target information; and
establishing a communication between the first vehicle and the second vehicle according to the second target information.

13. A vehicle implementing the method according to claim 11, comprising:
the first smart apparatus configured to acquire the first target information and the transmission direction information;
the first horn, and
the first horn control portion configured to control the first horn to send the first sound wave signal modulated by the first target information to the second vehicle based on the transmission direction information.

14. The vehicle according to claim 13, wherein the vehicle comprises at least one of a boat, an aircraft, or an unmanned aerial vehicle (UAV).

\* \* \* \* \*